US008669923B2

(12) United States Patent
Choi et al.

(10) Patent No.: US 8,669,923 B2
(45) Date of Patent: Mar. 11, 2014

(54) PIXEL AND ORGANIC LIGHT EMITTING DISPLAY DEVICE USING THE SAME

(75) Inventors: In-Ho Choi, Yongin (KR); Yong-Sung Park, Yongin (KR); Deok-Young Choi, Yongin (KR); Soon-Sung Ahn, Yongin (KR); Chul-Kyu Kang, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 757 days.

(21) Appl. No.: 12/879,901

(22) Filed: Sep. 10, 2010

(65) Prior Publication Data

US 2011/0193768 A1 Aug. 11, 2011

(30) Foreign Application Priority Data

Feb. 9, 2010 (KR) ........................ 10-2010-0011904

(51) Int. Cl.

| | |
|---|---|
| ***G09G 3/30*** | (2006.01) |
| ***G09G 3/32*** | (2006.01) |
| ***G06F 3/038*** | (2013.01) |
| ***G09G 5/00*** | (2006.01) |

(52) U.S. Cl.
USPC ................................ 345/76; 345/82; 345/204

(58) Field of Classification Search
None
See application file for complete search history.

(56) References Cited

U.S. PATENT DOCUMENTS

| | | | | |
|---|---|---|---|---|
| 2010/0001983 | A1* | 1/2010 | Abe | 345/211 |
| 2011/0164024 | A1 | 7/2011 | Ono | |

FOREIGN PATENT DOCUMENTS

| | | | |
|---|---|---|---|
| JP | 2007-140318 | | 6/2007 |
| JP | 2007-206590 | * | 8/2007 |
| KR | 10-2006-0045279 | | 5/2006 |
| KR | 10-2006-0113334 | | 11/2006 |
| WO | WO 2008/075697 | * | 6/2008 |
| WO | WO 2010/041426 A1 | | 4/2010 |

OTHER PUBLICATIONS

KIPO Office Action dated Mar. 26, 2012, for Korean priority Patent application No. 10-2010-0011904, (1 page).

KR Office Action dated Jun. 21, 2011 issued in Korean priority Application No. 10-2010-0011904, 3 pages.

* cited by examiner

*Primary Examiner* — Ariel Balaoing
*Assistant Examiner* — Christopher Kohlman
(74) *Attorney, Agent, or Firm* — Christie, Parker & Hale, LLP

(57) ABSTRACT

A pixel includes: an OLED; a first transistor having a first electrode coupled to a power source and a second electrode coupled to the OLED and configured to control a magnitude of current supplied to the OLED; a third transistor having a first electrode coupled a first node and a second electrode coupled to a gate electrode of the first transistor; a capacitor coupled between the first node and a second electrode of the first transistor; a second transistor having a first electrode coupled to the first node and a second electrode coupled to a data line and configured to be turned on when the third transistor is turned off; and a fourth transistor having a first electrode coupled to a gate electrode of the first transistor and a second electrode coupled to a reference power source and configured to be turned on and off concurrently with the second transistor.

13 Claims, 4 Drawing Sheets

PIXEL AND ORGANIC LIGHT EMITTING DISPLAY DEVICE USING THE SAME

CROSS-REFERENCE TO RELATED APPLICATION

This application claims priority to and the benefit of Korean Patent Application No. 10-2010-0011904, filed on Feb. 9, 2010, in the Korean Intellectual Property Office, the entire content of which is incorporated herein by reference.

BACKGROUND

1. Field

Aspects of embodiments according to the present invention relate to a pixel and an organic light emitting display device using the same.

2. Description of Related Art

Recently, various flat panel display devices having light weight and small volume and capable of reducing disadvantages such as large weight and volume of a cathode ray tube have been developed. There are various flat panel displays such as a liquid crystal display (LCD), a field emission display (FED), a plasma display panel (PDP), and an organic light emitting display.

Among the flat panel displays, the organic light emitting display is a device for displaying an image using organic light emitting diodes that emit light through the recombination of electrons and holes, and has a rapid response and low power consumption.

SUMMARY

Aspects of embodiments according to the present invention are directed to a pixel for displaying an image of desired brightness regardless of a voltage applied to an anode electrode of an organic light emitting diode and an organic light emitting display device using the same.

Aspects of embodiments of the present invention also provide a pixel capable of displaying an image of uniform brightness regardless of a threshold voltage difference of a driving transistor and an organic light emitting display device using the same.

In one embodiment, a pixel includes: an organic light emitting diode; a first transistor having a first electrode coupled to a first power source and a second electrode coupled to the organic light emitting diode and configured to control a magnitude of a current supplied to the organic light emitting diode; a third transistor having a first electrode coupled to a first node and a second electrode coupled to a gate electrode of the first transistor; a storage capacitor coupled between the first node and a second electrode of the first transistor; a second transistor having a first electrode coupled to the first node and a second electrode coupled to a data line and configured to be turned on during a first period in which the third transistor is turned off; and a fourth transistor having a first electrode coupled to the gate electrode of the first transistor and a second electrode coupled to a reference power source and configured to be turned on and off concurrently with the second transistor.

The pixel may further include a fifth transistor coupled between the second electrode of the first transistor and the organic light emitting diode and configured to be turned on during a second period which partially overlaps with the first period. The fifth transistor may be configured to be turned on for an early part of the first period. The third transistor may be configured to be turned on during a third period which partially overlaps with the second period. The reference power source may be separate from the first power source and may be configured to supply a voltage substantially equal to a voltage that the first power source is configured to supply. The reference power source may be the first power source. The first, second, third, fourth, and fifth transistors may be NMOS transistors.

In another embodiment of the present invention, an organic light emitting display device includes: a scan driver configured to supply a plurality of scan signals to a plurality of scan lines sequentially and to supply a plurality of light emission control signals to a plurality of light emission control lines sequentially; a data driver configured to supply a plurality of data signals to a plurality of data lines; and a plurality of pixels located at crossing regions of the scan lines and the data lines; wherein each of the pixels coupled to an ith (i is a natural number) scan line of the scan lines includes: an organic light emitting diode; a first transistor having a first electrode coupled to a first power source and a second electrode coupled to the organic light emitting diode and configured to control a magnitude of a current supplied to the organic light emitting diode; a third transistor having a first electrode coupled to a first node, a second electrode coupled to a gate electrode of the first transistor, and a gate electrode coupled to an (i−1)th light emission control line; a storage capacitor coupled between the first node and a second electrode of the first transistor; a second transistor having a first electrode coupled to the first node, a second electrode coupled to a data line of the data lines, and a gate electrode coupled to the ith scan line; and a fourth transistor having a first electrode coupled to the gate electrode of the first transistor, a second electrode coupled to a reference power source and configured to be turned on and off concurrently with the second transistor.

The organic light emitting display device may further include a fifth transistor having a first electrode coupled to the second electrode of the first transistor, a second electrode coupled to the organic light emitting diode, and a gate electrode coupled to an ith light emission control line of the emission control lines. The scan driver may be configured to supply an ith light emission control signal of the light emission control signals to the ith light emission control line to partially overlap with the ith scan signal supplied to the ith scan line and to completely overlap with a scan signal of the scan signals supplied to an (i+1)th scan line of the scan lines.

According to the pixel of embodiments of the present invention and the organic light emitting display using the same, the voltage stored in the storage capacitor is determined regardless of the voltage applied to the anode electrode of the organic light emitting diode so that an image of desired brightness can be displayed. In addition, because the current flowing through the organic light emitting diode does not depend on the threshold voltage of the driving transistor, an image of substantially uniform brightness can be displayed.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

Figure 1:
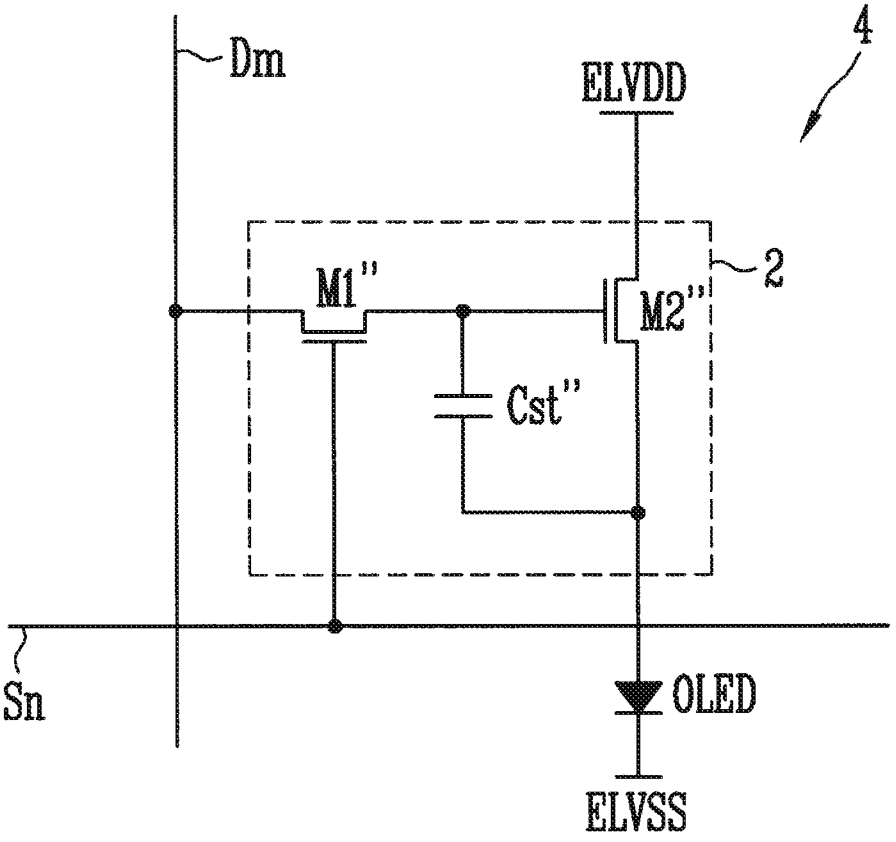
FIG. 1 (RELATED ART)
FIG. 1 is a circuit diagram illustrating a conventional pixel.

Hereinafter, certain exemplary embodiments according to the present invention will be described with reference to the accompanying drawings. Here, when a first element is described as being coupled to a second element, the first element may be directly coupled to the second element but or may be indirectly coupled to the second element via a third element. Further, some of the elements that are not essential to a complete understanding of the invention are omitted for clarity. Also, like reference numerals refer to like elements throughout.

FIG. 1 is a circuit diagram illustrating a conventional pixel of an organic light emitting display device. In FIG. 1, transistors included in the pixel are n-type metal oxide semiconductors (NMOSs).

Referring to FIG. 1, a pixel 4 of the organic light emitting display device includes an organic light emitting diode (OLED) and a pixel circuit 2 coupled to a data line Dm and a scan line Sn to control the OLED.

An anode electrode of the OLED is coupled to the pixel circuit 2 and a cathode electrode thereof is coupled to a second power source ELVSS. The OLED generates light having a brightness (e.g., a predetermined brightness) in accordance with a current supplied from the pixel circuit 2.

The pixel circuit 2 controls the amount of current supplied to the OLED in accordance with a data signal supplied to the data line Dm when a scan signal is supplied to the scan line Sn. To this end, the pixel circuit 2 includes a second transistor M2" (that is, a driving transistor) coupled between a first power source ELVDD and the OLED, a first transistor M1" coupled between the second transistor M2", the data line Dm, and the scan line Sn, and a storage capacitor Cst" coupled between a gate electrode and a second electrode of the second transistor M2".

A gate electrode of the first transistor M1" is coupled to the scan line Sn and a first electrode of the first transistor M1" is coupled to the data line Dm. A second electrode of the first transistor M1" is coupled to a first terminal of the storage capacitor Cst". Here, the first electrode is a source electrode or a drain electrode and the second electrode is the other electrode. For example, when the first electrode is the drain electrode, the second electrode is the source electrode. The first transistor M2" coupled to the scan line Sn and the data line Dm is turned on when the scan signal is supplied from the scan line Sn and supplies the data signal supplied from the data line Dm to the storage capacitor Cst". The storage capacitor Cst" stores a voltage corresponding to the data signal.

The gate electrode of the second transistor M2" is coupled to the first terminal of the storage capacitor Cst" and a first electrode of the second transistor M2" is coupled to the first power source ELVDD. The second electrode of the second transistor M2" is coupled to a second terminal of the storage capacitor Cst" and an anode electrode of the OLED. The second transistor M2" controls the amount of current flowing from the first power source ELVDD to the second power source ELVSS via the OLED in response to a voltage stored in the storage capacitor Cst".

The first terminal of the storage capacitor Cst" is coupled to the gate electrode of the second transistor M2" and the second terminal of the storage capacitor Cst" is coupled to the anode electrode of the OLED. The storage capacitor Cst" stores a voltage corresponding to the data signal.

The pixel 4 emits light having a brightness (e.g., a predetermined brightness) by supplying current corresponding to the voltage stored in (or charged to) the storage capacitor Cst" to the OLED. However, it may be difficult for the organic light emitting display device shown in FIG. 1 to display an image having uniform brightness due to variations in the threshold voltages of the second transistors M2" of the pixels.

In addition, because the second terminal of the storage capacitor Cst" is coupled to the anode electrode of the OLED, the voltage stored to the storage capacitor Cst" is affected by the voltage of the second power source ELVSS and the threshold voltage of the OLED. Also, it may be difficult for the pixel 4 to display an image having a desired brightness due to a voltage drop of the second power source ELVSS and the change (or variations) of the threshold voltage of the OLED.

Hereinafter, embodiments of the present invention will be described in detail with reference to FIGS. 2 to 5.

Figure 2:
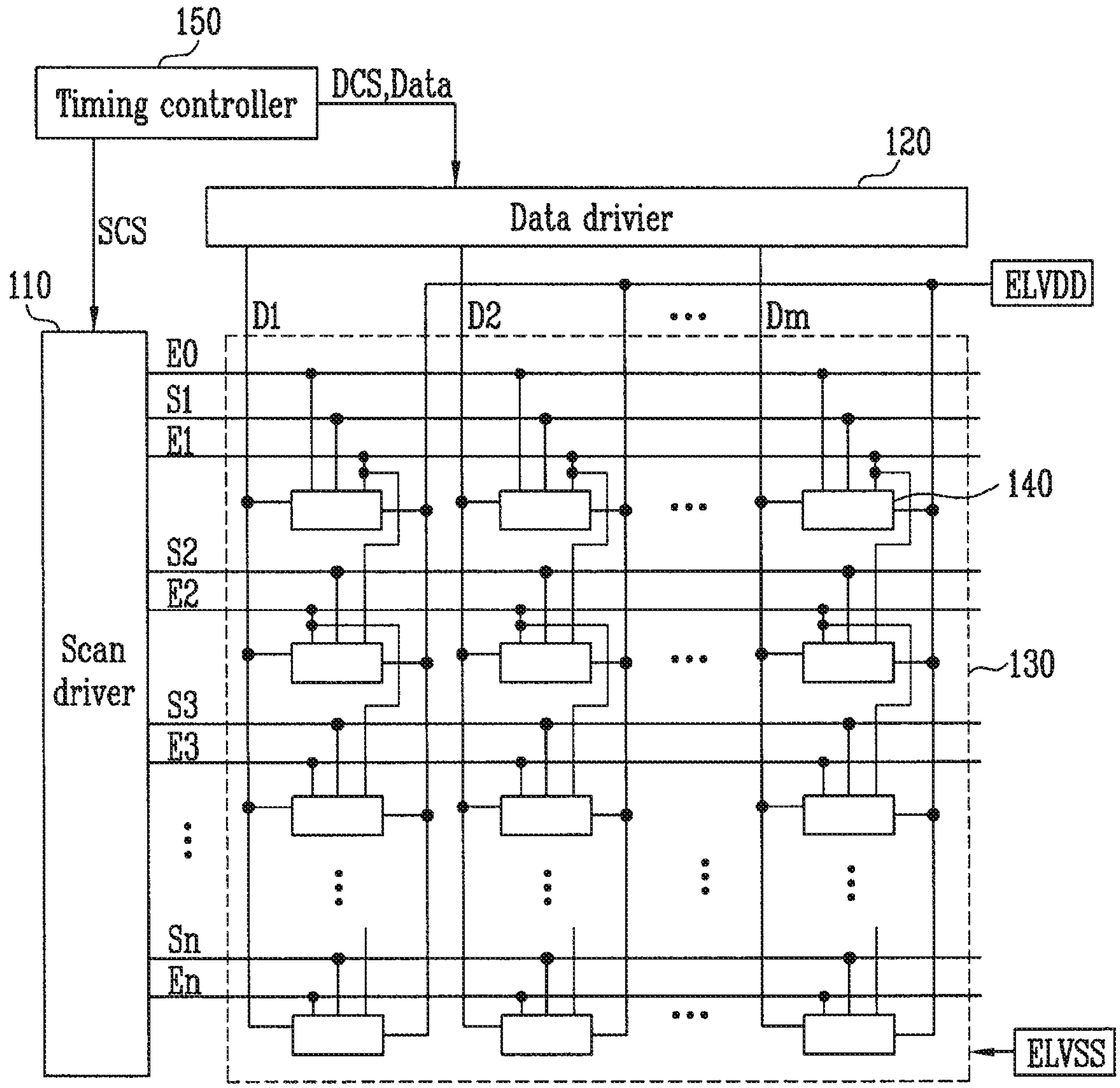
FIG. 2 is a schematic circuit diagram illustrating an organic light emitting display device according to one embodiment of the present invention.

FIG. 2 is a circuit diagram illustrating an organic light emitting display device according to one embodiment of the present invention.

Referring to FIG. 2, an organic light emitting display device according to one embodiment of the present invention includes pixels 140 coupled to scan lines S1 to Sn, light emission control lines E0 to En, and data lines D1 to Dm, a scan driver 110 for driving the scan lines S1 to Sn and the light emission control lines E0 to En, a data driver 120 for driving the data lines D1 to Dm, and a timing controller 150 for controlling the scan driver 110 and the data driver 120.

The scan driver 110 receives a scan driver control signal SCS from the timing controller 150. The scan driver 110 then generates a plurality of scan signals and supplies the generated scan signals to the scan lines S1 to Sn sequentially. In addition, the scan driver 110 generates a plurality of light emission control signals and supplies the generated light emission control signals to the light emission control lines E0 to En sequentially. Here, a light emission control signal supplied to an ith (i is a natural number or non-negative integer) light emission control signal Ei partially overlaps with a scan signal supplied to an ith scan line Si and completely overlaps with a scan signal supplied to an (i+1)th scan line Si+1. The transistors included in the pixel 140 are turned on when the scan signal is set to a voltage (for example, a high voltage), and the transistors included in the pixel 140 are turned off when the light emission control signal is set to a voltage (for example, a low voltage).

The data driver 120 receives a data driver control signal DCS from the timing controller 150. The data driver 120, then supplies a plurality of data signals to the data lines D1 to Dm when the scan signals are supplied.

The timing controller 150 generates the data driver control signal DCS and the scan driver control signal SCS in response to a synchronizing signal supplied from the exterior (e.g., from an external device). The data driver control signal DCS generated by the timing controller 150 is supplied to the data driver 120 and the scan driver control signal SCS is supplied to the scan driver 110. The timing controller 150 supplies data supplied from the exterior (e.g., an external device) to the data driver 120.

A display unit 130 receives a first power from a first power source ELVDD and a second power from a second power source ELVSS from the exterior, and supplies the same to the pixels 140. Each of the pixels 140, which receives the first power from the first power source ELVDD and the second power from the second power source ELVSS, generates light (or light having a luminance) corresponding to the data signal. To this end, each of the pixels 140 includes a plurality of NMOS transistors.

Figure 3:
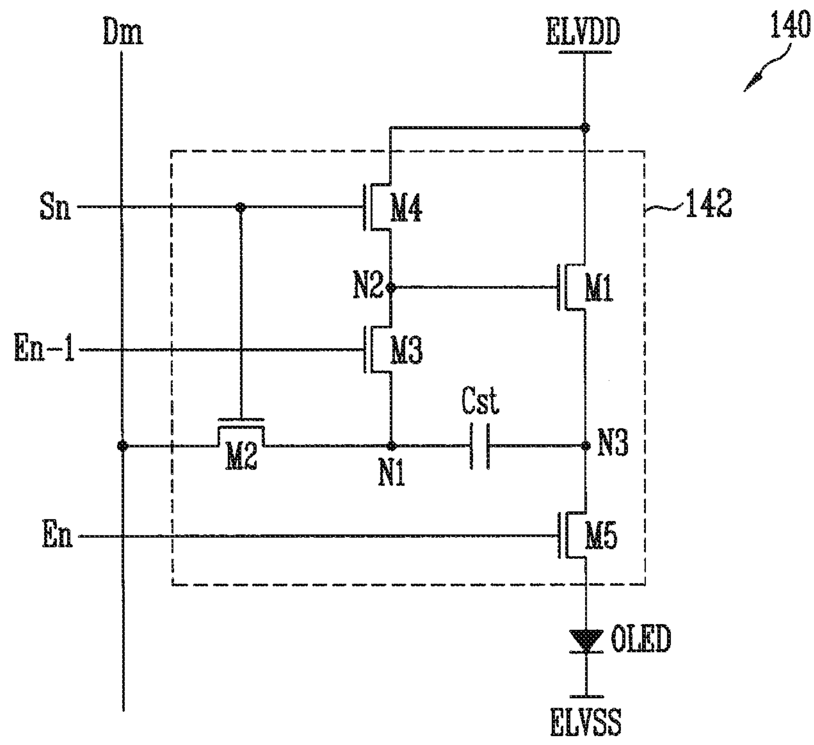
FIG. 3 is a circuit diagram illustrating a pixel according to a first embodiment of the present invention.

FIG. 3 is a circuit diagram illustrating a pixel according to a first embodiment of the present invention. For the sake of convenience, FIG. 3 shows a pixel 140 coupled to an nth scan line Sn and an mth data line Dm.

Referring to FIG. 3, the pixel 140 according to the first embodiment of the present invention includes an organic light emitting diode (OLED) and a pixel circuit 142 coupled to the scan line Sn, the light emission control lines En−1 and En, and the data line Dm, for controlling the OLED. Other pixels are similarly coupled to a corresponding scan line, a corresponding data line, and corresponding light emission control lines.

An anode electrode of the OLED is coupled to the pixel circuit 142 and a cathode electrode of the OLED is coupled to a second power source ELVSS. The OLED generates light having a brightness (e.g., a predetermined brightness) in response to the current supplied from the pixel circuit 142.

The pixel circuit 142 stores a voltage corresponding to a threshold voltage of a first transistor M1 (that is, the driving transistor) and the data signal when the scan signal is supplied to the scan line Sn and controls the amount of current supplied to the OLED in accordance with the stored voltage. To this end, the pixel circuit 142 includes first to fifth transistors M1 to M5 and a storage capacitor Cst.

A gate electrode of the first transistor M1 is coupled to a second node N2 and a first electrode of the first transistor M1 is coupled to a first power source ELVDD. A second electrode of the first transistor M1 is coupled to a third node N3. The first transistor M1 controls the amount of current flowing from the first power source ELVDD to the second power source ELVSS via the OLED in response to the voltage applied to the second node N2.

A gate electrode of the second transistor M2 is coupled to the scan line Sn and a first electrode of the second transistor M2 is coupled to the data line Dm. A second electrode of the second transistor M2 is coupled to the first node N1. The second transistor is turned on when the scan signal is supplied to the scan line Sn and electrically connects the data line Dm to the first node N1. In this embodiment, the scan signal is a high level (e.g., logic high signal).

A gate electrode of the third transistor M3 is coupled to an (n−1)th light emission control line En−1 and a first electrode of the third transistor M3 is coupled to the first node N1. A second electrode of the third transistor M3 is coupled to a second node N2. The third transistor M3 is turned off when the light emission control signal is supplied to the (n−1)th light emission control line En−1 and is turned on at other times (e.g., when the light emission control signal is not supplied) to electrically connect the first node N1 to the second node N2.

A gate electrode of the fourth transistor M4 is coupled to the scan line Sn and a first electrode of the fourth transistor M4 is coupled to the first power source ELVDD. A second electrode of the fourth transistor M4 is coupled to the second node N2. The fourth transistor M4 is turned on when the scan signal is supplied to the scan line Sn and supplies a voltage of the first power source ELVDD to the second node N2.

A gate electrode of the fifth transistor M5 is coupled to the nth light emission control line En and a first electrode of the fifth transistor M5 is coupled to the third node N3. A second electrode of the fifth transistor M5 is coupled to the anode electrode of the OLED. The fifth transistor M5 is turned off when the light emission control signal is supplied to the nth light emission control line En.

The storage capacitor Cst is coupled between the first node N1 and the third node N3. The storage capacitor Cst stores a voltage corresponding to the data signal and the threshold voltage of the first transistor M1.

Figure 4:
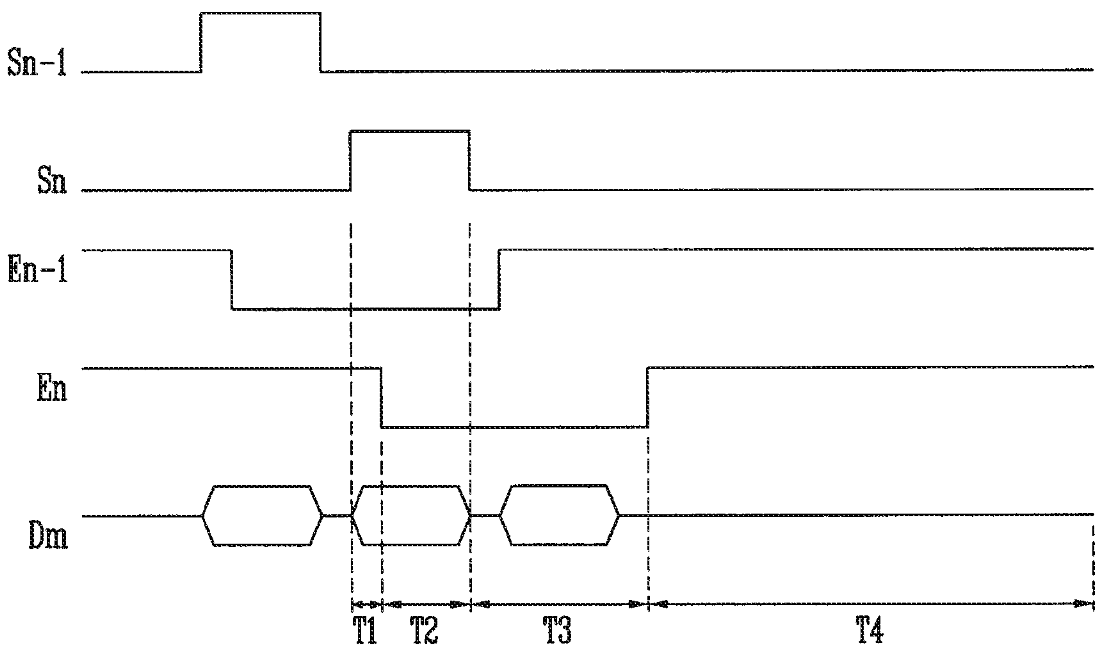
FIG. 4 is a waveform diagram illustrating a driving method of the pixel of FIG. 3.

FIG. 4 is a waveform diagram illustrating a driving method of the pixel of FIG. 3.

Referring to FIG. 4, first, the scan signal is supplied to the scan line Sn during a first period T1. When scan signal is supplied to the scan line Sn, the second transistor M2 and the fourth transistor M4 are turned on.

When the second transistor M2 is turned on, the data signal is supplied to the first node N1. At this time, a voltage of the first node N1 is set to a voltage Vdata of the data signal. When the fourth transistor M4 is turned on, a voltage of the first power source ELVDD is applied to the second node N2. Because the fifth transistor M5 is turned on during the first period T1, a voltage of the third node N3 is set to the sum of a voltage of the second power source ELVSS and the threshold voltage of the OLED.

The light emission control signal is supplied to the light emission control line En during a second period T2. When the light emission control signal is supplied to the nth light emission control signal En, the fifth transistor M5 is turned off. At this time, because the first transistor M1 is diode-connected, a voltage of the third node N3 is set to a difference between the threshold voltage of the first transistor M1 and the voltage of the first power source ELVDD (ELVDD−Vth(M1)). At this time, the first node N1 is set to a voltage Vdata of the data signal so that the storage capacitor Cst is charged with the voltage expressed by Equation 1.

$$V(C)=V\text{data}-(ELVDD-V\text{th}(M1)) \quad \text{Equation 1}$$

In Equation 1, V(C) refers to a voltage stored in the storage capacitor Cst. Referring to Equation 1, a voltage corresponding to the data signal and the threshold voltage of the first transistor M1 is stored in the storage capacitor Cst during the second period T2.

The supply of the scan signal to the scan line Sn is stopped during a third period T3. When the supply of the scan signal to the scan line Sn is stopped, the second transistor M2 and the fourth transistor M4 are turned off. The supply of the light emission control signal to the (n−1)th light emission control line En−1 is stopped during the third period T3 and the third transistor M3 is turned on. When the third transistor M3 is turned on, the first node N1 and the second node N2 are electrically coupled to each other. When the first node N1 and the second node N2 are electrically coupled, a voltage of the second node N2 is changed to a voltage of the first node N1. In other words, the voltage of the second node N2 is changed to the voltage stored in the storage capacitor Cst.

The supply of the light emission control signal to the nth light emission control line En is stopped during a fourth period T4. When the supply of the light emission control signal to the nth light emission control line En is stopped, the fifth transistor M5 is turned on. When the fifth transistor M5 is turned on, the first transistor M1 supplies a current (e.g., a predetermined current) corresponding to a voltage applied to the second node N2 to the OLED. Here, because the voltage of the third node N3 changes according to the current supplied to the OLED and because the second node N2 is set to a floating state, the storage capacitor Cst maintains the voltage stored during the second period T2.

A voltage Vgs between the gate electrode and the source electrode of the first transistor M1 is set by Equation 1, and the current flowing through the OLED is set by Equation 2.

$$
\begin{aligned}
Ioled &= \beta/2(Vgs - Vth(M1))^2 \\
&= \beta/2(Vdata - (ELVDD - Vth(M1)) - Vth(M1))^2 \\
&= \beta/2(Vdata - ELVDD)^2
\end{aligned}
\quad \text{Equation 2}
$$

Referring to Equation 2, the current flowing through the OLED is determined regardless of (or does not depend on) the threshold voltage of the first transistor M1. The voltage stored in the storage capacitor Cst is determined regardless of the voltage of the third node N3 and an image of desired brightness can be displayed.

Figure 5:
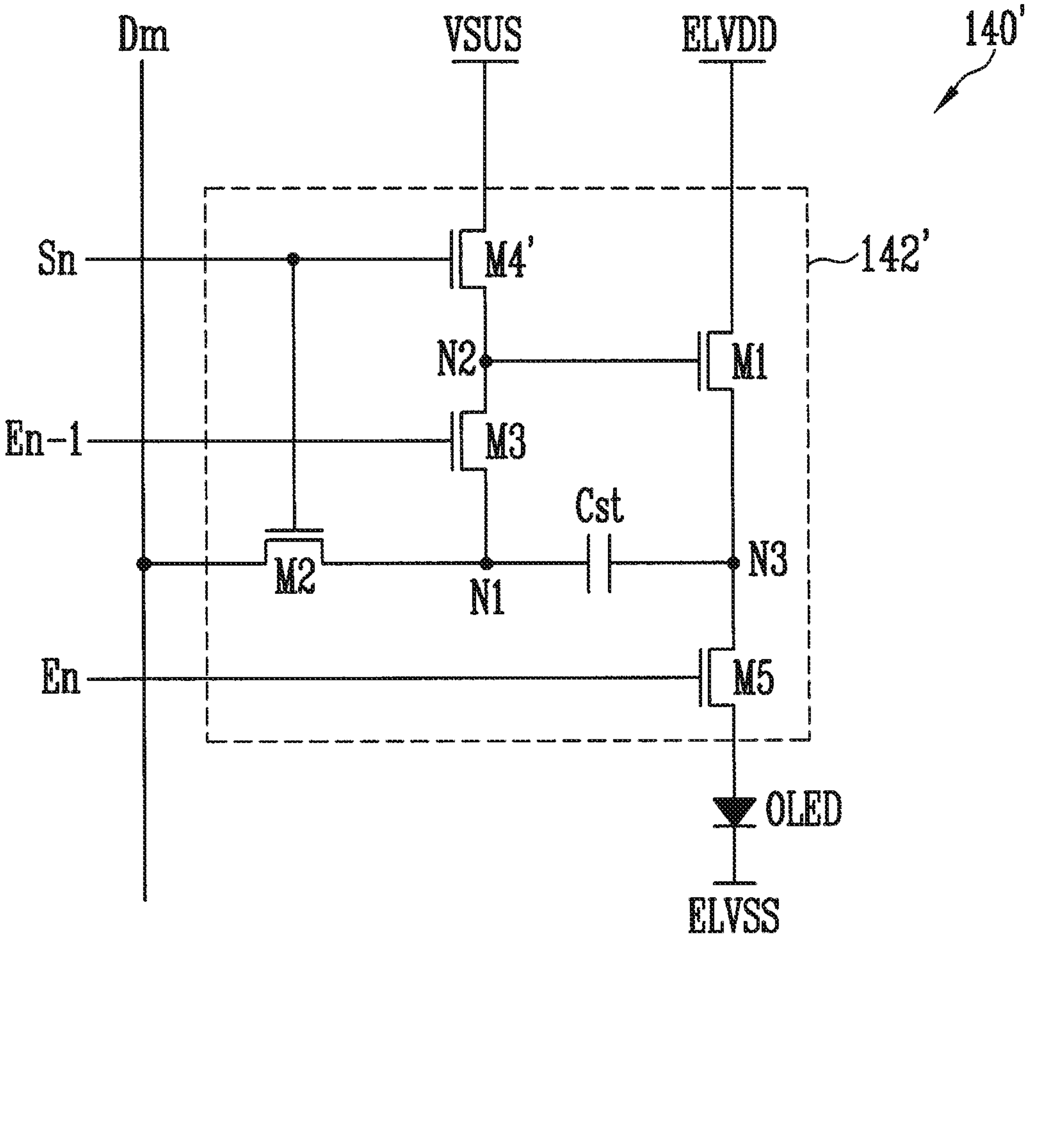
FIG. 5 is a circuit diagram illustrating a pixel according to a second embodiment of the present invention.

FIG. 5 is a circuit diagram illustrating a pixel according to a second embodiment of the present invention. In the description of FIG. 5, the same reference numerals as those used in FIG. 3 are assigned to like elements and their descriptions will be omitted.

Referring to FIG. 5, a pixel 140' according to the second embodiment of the present invention includes an OLED and a pixel circuit 142' for controlling the amount of current supplied to the OLED. The pixel 140' can be used instead of the pixel 140 in FIG. 2, for example.

A first electrode of a fourth transistor M4' included in the pixel circuit 142' is coupled to a reference power source Vsus and a second electrode of the fourth transistor M4' is coupled to the second node N2. A gate electrode of the fourth transistor M4' is coupled to the scan line Sn. The fourth transistor M4' supplies a voltage of the reference power source Vsus to the second node N2 when the scan signal is supplied to the scan line Sn.

In the second embodiment of the present invention, the fourth transistor M4' is not coupled to the first power source ELVDD but instead to the reference power source Vsus. As such, when the fourth transistor M4' is coupled to the reference power source Vsus, the amount of current flowing through the OLED can be controlled regardless of a voltage drop of the first power source ELVDD. Here, the voltage of the reference power source Vsus may be set to the same voltage as that of the first power source ELVDD.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A pixel comprising:

an organic light emitting diode;

a first transistor having a first electrode coupled to a first power source and a second electrode coupled to the organic light emitting diode and configured to control a magnitude of a current supplied to the organic light emitting diode;

a third transistor having a first electrode coupled to a first node and a second electrode coupled to a gate electrode of the first transistor;

a storage capacitor coupled between the first node and a second electrode of the first transistor;

a second transistor having a first electrode coupled to the first node and a second electrode coupled to a data line and configured to be turned on during a first period;

a fourth transistor having a first electrode coupled to the gate electrode of the first transistor and a second electrode coupled to a reference power source and configured to be turned on and off concurrently with the second transistor; and a fifth transistor coupled between the second electrode of the first transistor and the organic light emitting diode and configured to be turned on during the first period.

2. The pixel as claimed in claim 1, wherein the fifth transistor is further configured to be turned off during a second period that is immediately adjacent to the first period.

3. The pixel as claimed in claim 2, wherein the third transistor is configured to be turned on during a third period that is immediately adjacent to the second period.

4. The pixel as claimed in claim 1, wherein the reference power source is separate from the first power source and is configured to supply a voltage substantially equal to a voltage that the first power source is configured to supply.

5. The pixel as claimed in claim 1, wherein the reference power source is the first power source.

6. The pixel as claimed in claim 2, wherein the first, second, third, fourth, and fifth transistors are NMOS transistors.

7. The pixel as claimed in claim 1, wherein the third transistor is configured to be turned off during a first period.

8. An organic light emitting display device comprising:

a scan driver configured to supply a plurality of scan signals to a plurality of scan lines sequentially and to supply a plurality of light emission control signals to a plurality of light emission control lines sequentially;

a data driver configured to supply a plurality of data signals to a plurality of data lines; and a plurality of pixels located at crossing regions of the scan lines and the data lines, wherein each of the pixels coupled to an ith (i is a natural number) scan line of the scan lines comprises:

an organic light emitting diode;

a first transistor having a first electrode coupled to a first power source and a second electrode coupled to the organic light emitting diode and configured to control a magnitude of a current supplied to the organic light emitting diode;

a third transistor having a first electrode coupled to a first node, a second electrode coupled to a gate electrode of the first transistor, and a gate electrode coupled to an (i−1)th light emission control line of the light emission control lines;

a storage capacitor coupled between the first node and a second electrode of the first transistor;

a second transistor having a first electrode coupled to the first node, a second electrode coupled to a data line of the data lines, and a gate electrode coupled to the ith scan line;

a fourth transistor having a first electrode coupled to the gate electrode of the first transistor, a second electrode coupled to a reference power source and configured to be turned on and off concurrently with the second transistor; and a fifth transistor having a first electrode coupled to the second electrode of the first transistor, a second electrode coupled to the organic light emitting diode, and configured to be turned on during a period in which the second transistor is turned on.

9. The organic light emitting display device as claimed in claim 8, wherein the fifth transistor has a gate electrode coupled to an ith light emission control line of the emission control lines.

10. The organic light emitting display device as claimed in claim 9, wherein the scan driver is configured to supply an ith light emission control signal of the light emission control signals to the ith light emission control line to partially overlap with the ith scan signal supplied to the ith scan line and to completely overlap with a scan signal of the scan signals supplied to an (i+1 )th scan line of the scan lines.

11. The organic light emitting display device as claimed in claim 9, wherein the first, second, third, fourth, and fifth transistors are NMOS transistors.

12. The organic light emitting display device as claimed in claim 8, wherein the reference power source is separate from the first power source and is configured to supply a voltage equal to a voltage that the power source is configured to supply.

13. The organic light emitting display device as claimed in claim 8, wherein the reference power source is the first power source.

* * * * *